(12) United States Patent
Mulin et al.

(10) Patent No.: US 11,474,759 B2
(45) Date of Patent: Oct. 18, 2022

(54) IMAGE FORMING APPARATUS PROVIDING DISTRIBUTED RENDERING SERVICE

(71) Applicant: Hewlett-Packard Development Company, L.P., Spring, TX (US)

(72) Inventors: Aleksei Mulin, Seongnam-si (KR); Chang-Soo Park, Seongnam-si (KR); Gi Won Seo, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/281,328

(22) PCT Filed: Aug. 13, 2019

(86) PCT No.: PCT/US2019/046363
§ 371 (c)(1),
(2) Date: Mar. 30, 2021

(87) PCT Pub. No.: WO2020/153993
PCT Pub. Date: Jul. 30, 2020

(65) Prior Publication Data
US 2021/0397391 A1 Dec. 23, 2021

(30) Foreign Application Priority Data
Jan. 25, 2019 (KR) .................. 10-2019-0009974

(51) Int. Cl.
*G06F 3/12* (2006.01)
(52) U.S. Cl.
CPC .......... *G06F 3/1226* (2013.01); *G06F 3/1203* (2013.01); *G06F 3/128* (2013.01)

(58) Field of Classification Search
None
See application file for complete search history.

(56) References Cited

U.S. PATENT DOCUMENTS

| | | | | |
|---|---|---|---|---|
| 2011/0090535 A1* | 4/2011 | Towata | ................. | G06F 3/1272 358/1.15 |
| 2011/0317176 A1* | 12/2011 | Isshiki | .................. | G06F 3/1205 358/1.15 |

(Continued)

FOREIGN PATENT DOCUMENTS

| | | |
|---|---|---|
| JP | 2009-206580 A | 9/2009 |
| JP | 2012-29076 A | 2/2012 |
| JP | 2017-163557 A | 9/2017 |

*Primary Examiner* — Henok Shiferaw
(74) *Attorney, Agent, or Firm* — Jefferson IP Law, LLP

(57) ABSTRACT

An image forming apparatus is provided. The image forming apparatus includes a printing engine, memory to store information indicating correspondences of a plurality of file types and uniform resource identifier (URI) addresses of rendering subjects to render printing data of each file type of the plurality of file types in correspondence to each of a plurality of external apparatuses, a communication device to receive a file by a direct printing function method from an external apparatus, and a processor to identify the type of the received file, determine a URI address corresponding to the identified file type and the external apparatus, according to the information indicating correspondences, control the communication device to transmit the received file to the determined URI address, and receive, from the determined URI address, rendered data corresponding to the file.

15 Claims, 9 Drawing Sheets

(56) References Cited

U.S. PATENT DOCUMENTS

| | | |
|---|---|---|
| 2012/0008164 A1 | 1/2012 | Nanaumi |
| 2014/0211234 A1* | 7/2014 | Malik .................... G06F 3/1287 358/1.14 |
| 2014/0368865 A1 | 12/2014 | Gutnik et al. |
| 2015/0046970 A1 | 2/2015 | Shimizu |
| 2015/0092221 A1* | 4/2015 | Ochi ..................... G06F 3/1261 358/1.14 |
| 2015/0101039 A1* | 4/2015 | Torigoshi ................ G06F 21/44 726/17 |
| 2015/0153980 A1* | 6/2015 | Ito ....................... H04L 63/0281 358/1.14 |
| 2015/0199161 A1* | 7/2015 | Gutnik .................. G06F 3/1219 358/1.15 |
| 2016/0119490 A1* | 4/2016 | Matoba ................. G06F 3/1204 358/1.15 |
| 2018/0032485 A1 | 2/2018 | Kashimoto |

* cited by examiner

FIG. 3

| Distributed Rendering Service (DRS) Policy | File Types | Rendering Service URI |
|---|---|---|
| Mobile Print | Microsoft Office (*.docx, *.xlsx) | B<br>BB://B-agent |
| | Hangul Office (*.hwp) | A<br>https://render.a.com |
| | PDF, JPG | Local Emulation<br>http://localhost |
| | Default | C<br>CC://C-agent |
| Local Print | PDF, JPG, PRN | Local Emulation<br>http://localhost |
| | Default | C<br>CC://C-agent |
| Computer Print | Hangul Office (*.hwp) | A<br>https://render.a.com |
| | Default | Computer Driver |

IMAGE FORMING APPARATUS PROVIDING DISTRIBUTED RENDERING SERVICE

BACKGROUND

An image forming apparatus is an apparatus that performs generation, printing, receipt, transmission, etc. of image data, and as representative examples of an image forming apparatus, there are printers, copying machines, facsimiles, and multi-function printers that integrally implement the functions of the aforementioned apparatuses, etc.

An image forming apparatus can perform printing by receiving printing data converted into a printable format from an external apparatus. Meanwhile, in the case of an image forming apparatus that supports a direct printing function, the apparatus can perform printing by receiving printing data from an external apparatus directly, and rendering the printing data.

BRIEF DESCRIPTION OF THE DRAWINGS

FIG. 3 is a diagram which illustrates an example of information on a plurality of rendering policies;

DETAILED DESCRIPTION

Hereinafter, various examples of the disclosure will be described in detail with reference to the accompanying drawings. The examples described below may be implemented while being modified into several different forms. Also, with respect to matters that are widely known to those of ordinary skill in the art to which the following examples belong, detailed explanation will be omitted, for explaining the characteristics of the examples more clearly.

Meanwhile, the description in this specification that one element is "connected to" another element should be interpreted to include both the case where one element is 'directly connected to' another element, and the case where one element is 'connected to another element through still another element.' Also, the description in this specification that one element "includes" another element can be interpreted to mean that other elements may additionally be included, but not that other elements are excluded, unless there is any specific description meaning the contrary.

In this specification, the term "image forming job" may mean various kinds of jobs (e.g., printing, scanning or faxing) related to images such as formation of images or generation/storing/transmission of image files, etc. Also, the term "job" may also include all of a series of processes necessary for performing an image forming job.

In addition, "an image printing apparatus" refers to an apparatus that prints printing data generated at or obtained from an external apparatus like a computer, on recording paper. As examples of such an image forming apparatus, there are copying machines, printers, facsimiles or multi-function printers (MFPs) that multiply implement the functions of the aforementioned apparatuses through one apparatus, etc. Also, an image forming apparatus may mean all apparatuses that are capable of performing image forming jobs such as printers, scanners, fax machines, multi-function printers (MFPs) or display apparatuses, etc.

Further, "printing data" may mean data converted into a printable format at a printer. Meanwhile, if a printer supports direct printing, a file that the printer receives itself may be printing data.

Also, "a user" may mean a person who performs operations related to an image forming job by using an image forming apparatus, or a device connected to an image forming apparatus through wire/wirelessly. Meanwhile, "a manager" may mean a person who has authority to access all functions and the system of an image forming apparatus. "A manager" and "a user" may be the same person.

Figure 1:
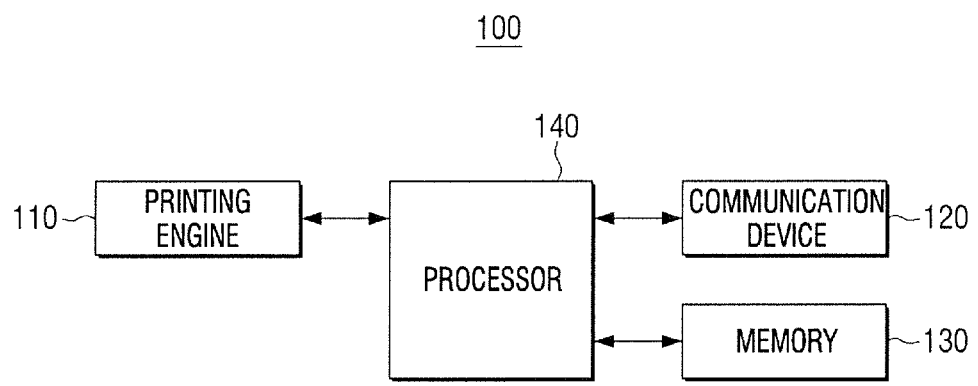
FIG. 1 is a block diagram which illustrates a schematic configuration of an image forming apparatus according to an example of the disclosure.

FIG. 1 is a block diagram which illustrates a schematic configuration of an image forming apparatus according to an example of the disclosure.

Referring to FIG. 1, an image forming apparatus 100 may consist of a printing engine 110, a communication device 120, memory 130 and a processor 140.

The printing engine 110 performs an image forming job. To be specific, the printing engine 110 may form an image on printing paper in the form of an electronic photograph. For this, the printing engine 110 may include a photosensitive drum (not shown), a charger (not shown), an exposure device (not shown), a developer (not shown), a transcriptor (not shown) and a fuser (not shown).

First, on the photosensitive drum, an electrostatic latent image may be formed. The exposure device may form an electrostatic latent image on the surface of the photosensitive drum by changing the surface potential of the photosensitive drum according to the information on the image to be printed. The developer may accommodate a developing agent in its inside, and develop an electrostatic latent image into a visible image by supplying the electrostatic latent image with the developing agent. The visible image formed on the photosensitive drum may be printed on printing paper by a transcriptor or an intermediate transcription belt (not shown). The fuser may fuse the charging toner on the printing paper by applying heat and pressure to the printing paper.

The communication device 120 is formed to connect the image forming apparatus 100 with an external apparatus (not shown), and it may be in the form of being connected through a local area network (LAN) and an Internet network, or be in the form of being connected through a universal serial bus (USB) port and a wireless module. Here, the wireless module may be WiFi, WiFi direct, near field communication (NFC), Bluetooth, etc.

Also, the communication device 120 may receive an instruction to perform a job from an external apparatus. In addition, the communication device 120 may transmit and receive data related to the aforementioned instruction to perform a job. For example, if a user's instruction for a job is printing of a specific file, the communication device 120 may receive printing data.

Here, the printing data may be data of a printer language such as a postscript (PS), a printer control language (PCL), etc. Also, in case the image forming apparatus 100 supports a direct printing function, the printing data may be a file itself such as PDF, XPS, BMP, JPG, etc. In case the received printing data is a file itself, a rendering process of converting the printing data into a printable format for the image forming apparatus may be necessary. Such a rendering process may be performed at the image forming apparatus 100 itself, or at an external server providing a rendering service.

Further, the communication device 120 may transmit the received printing data to an external server (not shown). To be specific, the communication device 120 may transmit the received printing data to an external server providing a rendering service. Here, the printing data transmitted to an external server is not the data of a printer language, but a file itself. Also, the communication device 120 may request rendering to the external server, along with transmitting the printing data.

In addition, the communication device 120 may receive rendering data from the external server. To be specific, when rendering of the printing data transmitted to the external server is completed, the communication device 120 may receive rendering data corresponding to the transmitted printing data from the external server.

Meanwhile, the external server providing a rendering service may be a server, or an electronic apparatus such as a PC, a laptop computer, a smartphone, etc., and is not limited thereto.

The memory 130 may store printing data. To be specific, the memory 130 may store printing data received through the communication device 120. The memory 130 as described above may be implemented as a storage medium in the image forming apparatus 100, but also as an external storage medium, a removable disk including a USB memory, a web server through a network, etc.

Also, with respect to each of a plurality of file types, the memory 130 may store address information of a subject that is capable of performing rendering of the printing data of the file type. Also, in case there are a plurality of subjects that are capable of performing rendering of the printing data of a specific file type, the memory 130 may store address information of each of the plurality of subjects performing rendering with respect to the file type. Meanwhile, files types may be identified by using file extension.

For example, in case subjects that are capable of performing rendering of printing data having file extension in the form of '*.hwp' are the image forming apparatus 100 and an external server A, the memory 130 may store the address information (ex. http://localhost) of the image forming apparatus 100 and the address information (ex. http://render.a-.com) of the server A as address information on the rendering service for the file extension in the form of '*.hwp.'

Here, the address information may be information on an Internet protocol (IP), a uniform resource locator (URL), a uniform resource name (URN) or a uniform resource identifier (URI), and is not limited thereto. Hereinafter, for the convenience of explanation, the address information will be assumed to be URI information.

In addition, the memory 130 may store rendering policy information. Here, rendering policy information refers to information on an address of a subject performing rendering that is set to perform rendering of each of a plurality of file types. Then, the processor 140 may determine a subject performing rendering of printing data by referring to the rendering policy information. Meanwhile, 'rendering policy information' may also be referred to by a different name.

For example, the memory 130 may store the addresses of the image forming apparatus 100 and the external server A as address information on a subject that is capable of performing rendering of printing data having file extension in the form of '*.hwp.' Here, in case the external server A is set as a subject performing rendering of printing data having file extension in the form of '*.hwp,' rendering policy information may include the address information (ex. http://render.a.com) of the server A with respect to file extension '*.hwp.'

A rendering policy as described above may change according to the setting of a user. A detailed operation in this regard will be described later with reference to FIG. 2.

Meanwhile, the memory 130 may store rendering policy information for each apparatus that transmitted printing data to the image forming apparatus 100. To be specific, a mobile apparatus, a storage medium like a USB, a PC, a laptop computer, etc. may transmit printing data to the image forming apparatus 100. Also, the memory 130 may store rendering policy information for each of a plurality of apparatuses generated by using the apparatus information of each of the plurality of apparatuses. Detailed descriptions in this regard will be made later with reference to FIG. 3.

In addition, the memory 130 may store rendering data. To be specific, the memory 130 may store rendering data received through the communication device 120.

The processor 140 controls each component in the image forming apparatus 100. To be specific, the processor 140 may be implemented as a CPU, an ASIC, etc., and may consist of a plurality of devices such as a clock generating circuit, a CPU, a graphic processor, etc., and control each component in the image forming apparatus 100.

When the processor 140 receives printing data from an external apparatus (not shown), the processor 140 may determine a subject to perform rendering of the received printing data.

To be specific, the processor 140 may identify the file type of the received printing data, identify the address information of a subject performing rendering corresponding to the identified file type, and determine a subject to perform rendering. To be more specific, the processor 140 may determine a subject to perform rendering by identifying a subject performing rendering corresponding to the identified file type by using rendering policy information stored in the memory 130.

Meanwhile, the processor 140 may determine a subject performing rendering by further considering information on an apparatus which transmitted printing data to the image forming apparatus 100. To be specific, the processor 140 may identify policy information corresponding to an apparatus which transmitted printing data to the image forming apparatus 100 among a plurality of pieces of policy information stored in the memory 130, by using the apparatus information of the apparatus which transmitted printing data. Then, the processor 140 may determine a subject to perform rendering by identifying a subject performing rendering corresponding to the file type of the printing data, by using the identified policy information. A detailed operation in this regard will be described later with reference to FIG. 3.

Also, the processor 140 may control the communication device 120 to transmit printing data to the determined subject performing rendering. To be specific, the processor 140 may control the communication device 120 to transmit the received printing data according to the URI address information of the identified subject performing rendering.

Further, the processor 140 may receive rendering data from the subject performing rendering. To be specific, when rendering of the printing data by the subject performing rendering is completed, the processor 140 may receive rendering data corresponding to the transmitted printing data from the URI address of the subject performing rendering.

Meanwhile, in case the determined subject performing rendering is the image forming apparatus, the processor 140 may perform rendering of the received printing data. To be specific, the processor 140 may parse the printing data, and perform rendering of the printing data by using a rendering module performing rendering corresponding to the file type of the received printing data.

Then, the processor 140 may control the printing engine 110 to print rendering data.

Meanwhile, even though printing data is transmitted to the subject performing rendering, the subject performing rendering may fail to render the printing data. For example, the processor 140 may receive a message notifying failure of rendering from the address of the subject performing rendering, or may not receive rendering data from the address of the subject performing rendering during a predetermined time period.

In this case, the processor 140 may transmit printing data to another subject that is capable of performing rendering. To be specific, the processor 140 may identify the file type of printing data, and identify whether there is another subject that is capable of performing rendering by using the address information of subjects that are capable of performing rendering of each of a plurality of file types stored in the memory 130. Then, if another subject is identified, the processor 140 may transmit printing data again to the address of the identified another subject. In case a plurality of other subjects that are capable of performing rendering are identified, the processor 140 may transmit printing data to a subject performing rendering that is set as a default.

Meanwhile, in case another subject that is capable of performing rendering is not identified, or rendering fails again, the processor 140 may determine that the rendering operation failed, and display a notification message to the user.

Further, the processor 140 may add address information on subjects that are capable of performing rendering of each file type. To be specific, the processor 140 may acquire information on a new subject that is capable of performing rendering of an existing file type from an external apparatus, through the communication device 120. Also, the processor 140 may acquire information on a subject that is capable of performing rendering of a new file type from an external apparatus, through the communication device 120. In addition, the processor 140 may add the received information to the address information of subjects that are capable of performing rendering of each of a plurality of file types stored in the memory 130.

For example, in a situation where the address information of the server A is stored in the memory 130 as a subject that is capable of performing rendering for the file extension '*.pdf,' the processor 140 may receive address information of a server B as another subject that is capable of performing rendering for '*.pdf from an external apparatus. Then, the processor 140 may store the address information of the server B with respect to the file extension'*.pdf in the memory 130.

As another example, in a situation where there is no address information of a subject that is capable of performing rendering for a file extension '*.hwp' in the memory 130, the processor 140 may receive the address information of the server A as a subject that is capable of performing rendering for '*.hwp' from an external apparatus. Then, the processor 140 may store the address information of the server A for the file extension '*.hwp' in the memory 130.

Meanwhile, methods for the processor 140 to acquire information on a new subject that is capable of performing rendering of an existing file type, or information on a subject that is capable of performing rendering of a new file type are not limited to the aforementioned examples, and a method may be implemented as a method of acquiring information by installing a new rendering program on the image forming apparatus 100. Detailed descriptions in this regard will be made later with reference to FIG. 4.

So far, only simple components constituting an image forming apparatus were illustrated and described, but various components may additionally be included in actual implementation. Descriptions in this regard will be made below with reference to FIG. 2.

Figure 2:
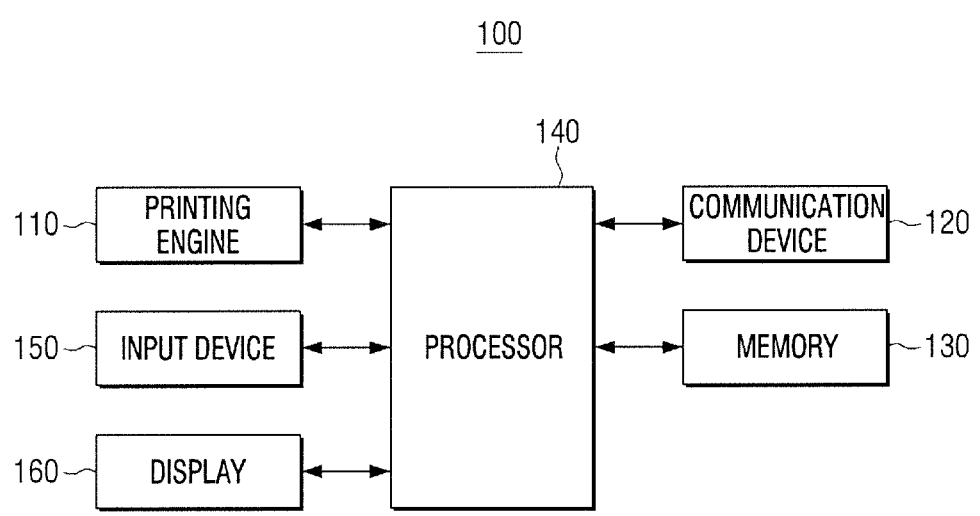
FIG. 2 is a block diagram which illustrates a detailed configuration of an image forming apparatus according to an example of the disclosure.

FIG. 2 is a block diagram which illustrates a detailed configuration of an image forming apparatus according to an example of the disclosure.

Referring to FIG. 2, an image forming apparatus 100 may consist of a printing engine 110, a communication device 120, memory 130, a processor 140, an input device 150 and a display 160.

As the printing engine 110, the communication device 120 and the memory 130 perform the same functions as described in FIG. 1, overlapping descriptions will be omitted. Also, as the processor 140 was described with reference to FIG. 1, descriptions made with reference to FIG. 1 will not be made again, and descriptions related to the components added in FIG. 2 will be made below.

The input device 150 includes a plurality of function keys which enable a user to set or select various kinds of functions supported at the image forming apparatus 100. Through this, a user can input various kinds of instructions for operation for the image forming apparatus 100. Also, the input device 150 may be implemented as a touch screen that is capable of performing the function of the display 160 at the same time.

In addition, the input device 150 may receive input of setting for a plurality of rendering policies from a user. To be specific, the input device 150 may receive input of setting such as addition, deletion, change, etc. of address information of rendering services for each of a plurality of file types from a user, with respect to each of a plurality of rendering policies.

For example, in case address information of a subject performing rendering with respect to '*.docx' is not set in a first rendering policy, the input device 150 may receive input of setting that adds the address information of the server B as address information of a subject performing rendering with respect to the file extension '*.docx' from a user.

As another example, in case address information of the image forming apparatus 100 is set as address information of a subject performing rendering with respect to the file extension '*.hwp' in a second rendering policy, the input device 150 may receive input of setting that changes the address information of a subject performing rendering with respect to the file extension '*.hwp' to the address information of the server A in the rendering policy A from a user.

Then, the processor 140 may update each of the plurality of rendering policies according to the setting input through the input device 150.

Meanwhile, methods for updating each of a plurality of rendering policies are not limited to the aforementioned examples, and a method may be implemented through communication with an external apparatus such as a mobile apparatus. Detailed descriptions in this regard will be made later with reference to FIG. 5.

The display 160 displays various types of information provided at the image forming apparatus 100. To be specific, the display 160 may display the operation mode of the image forming apparatus 100, or display a user interface window for receiving selection of various functions and options that can be selected by a user.

Also, the display 160 may display information on a plurality of rendering policies from a user through a user interface window. Then, after input of setting for a plurality of rendering policies is received from a user through the input device 150, the processor 140 may update each of the plurality of rendering policies according to the input setting.

Further, the display 160 may display information on the rendering process. To be specific, the display 160 may display information on the proceeding of rendering of printing data received through the communication device 120.

In the conventional technology, rendering of printing data received by an image forming apparatus was performed according to information on subjects performing rendering for each file type that were determined in advance at the time the image forming apparatus was manufactured. Accordingly, even if there is another subject that is capable of performing rendering with respect to a specific file type, and the rendering function through the subject is more excellent in the aspects of quality or time spent, etc., rendering through the subject could not be performed.

Also, in case a document in a new format that did not exist before was developed, and printing data having the file type of the document was received by an image forming apparatus, a rendering function could not be performed, because there was no information on a subject performing rendering with respect to the file type of the document.

Also, in the conventional technology, an image forming apparatus determined a subject performing rendering in consideration of only the file type of printing data, without consideration of an apparatus which requested a printing work to the image forming apparatus. Accordingly, subjects performing rendering for each file type with respect to each apparatus requesting a printing work to the image forming apparatus could not be set differently.

In contrast, an image forming apparatus according to an example of the disclosure can provide a more extended rendering function by adding address information of subjects that are capable of performing rendering for each of a plurality of file types, as described above.

To be specific, in case there is another subject performing rendering selected by a user other than a subject performing rendering set as a default in an image forming apparatus, setting can be made such that the subject performs rendering, through a setting operation by a user. Accordingly, an advantageous effect is exerted in the aspect of user convenience.

Also, in case a document in a new format that did not exist before is developed, setting can be made such that rendering of the document in a new format can be performed through a setting operation by a user, etc. even if the firmware for an image forming apparatus is not updated, or a new image forming apparatus is not purchased. Accordingly, an advantageous effect is exerted in the aspect of cost.

In addition, an image forming apparatus according to an example of the disclosure can vary setting of a rendering function with respect to each apparatus requesting a printing work to the image forming apparatus. Accordingly, the scope of setting of a rendering function based on user preference becomes wider, and user convenience can thereby be increased.

FIG. 3 is a diagram which illustrates an example of information on a plurality of rendering policies.

Referring to FIG. 3, the processor 140 may generate rendering policy information for each apparatus requesting a printing work.

To be specific, the processor 140 may generate rendering policy information by using the apparatus information of each apparatus, with respect to each apparatus such as a mobile apparatus, a storage medium such as a USB, etc., a PC, a laptop computer, etc. that can transmit printing data to the image forming apparatus 100.

For example, referring to FIG. 3, the processor 140 may respectively generate information on a mobile print rendering policy which is rendering policy information for a mobile apparatus, a local print rendering policy which is rendering policy information for a storage medium such as a USB, etc., and a computer print rendering policy which is rendering policy information for a PC.

Also, each of the mobile print rendering policy, the local print rendering policy, and the computer print rendering policy may include address information of subjects performing rendering that are set for each of a plurality of file types.

Referring to FIG. 3, in case the image forming apparatus 100 received printing data of which file extension is '*.docx,' the subject performing rendering may vary depending on from which apparatus the printing data was received.

In case the printing data was received from a mobile apparatus, according to the mobile print rendering policy, it can be figured out that the subject performing rendering corresponding to the file extension '*.docx' is B, and the address is 'BB://B-agent.' The processor 140 may transmit the printing data to 'BB://B-agent,' and receive rendering data from the address.

In contrast, in case the printing data was received through a storage medium such as a USB, etc., according to the local print rendering policy, it can be figured out that the subject performing rendering corresponding to the file extension '*.docx' is C, and the address is 'CC://c-agent.' The processor 140 may transmit the printing data to 'CC://c-agent,' and receive rendering data from the address.

Meanwhile, in case the printing data was received from a PC, according to the computer print rendering policy, it can be figured out that the subject performing rendering corresponding to the file extension '*.docx' is a computer driver. In this case, the processor 140 may request the PC to perform rendering of the printing data.

As described above, rendering policy information can be set differently for each apparatus transmitting printing data. Accordingly, the scope of setting of a rendering function based on user preference becomes wider, and user convenience can thereby be increased.

Meanwhile, in case the processor 140 receives a request for a printing work from a new apparatus, the processor 140 may generate a rendering policy for the new apparatus. Here, the newly generated rendering policy may be a rendering policy provided as a default.

So far, in illustrating and describing FIG. 3, it was illustrated and described that an image forming apparatus includes three policies, i.e., a mobile print rendering policy, a local print rendering policy, and a computer print rendering policy. However, in actual implementation, an image forming apparatus may be implemented in a manner of having four or more or two or fewer policies. Also, in the case of receiving printing data from a plurality of mobile devices, an image forming apparatus may be implemented in a manner of having mobile print rendering policies for each of a plurality of mobile devices.

Figure 4:
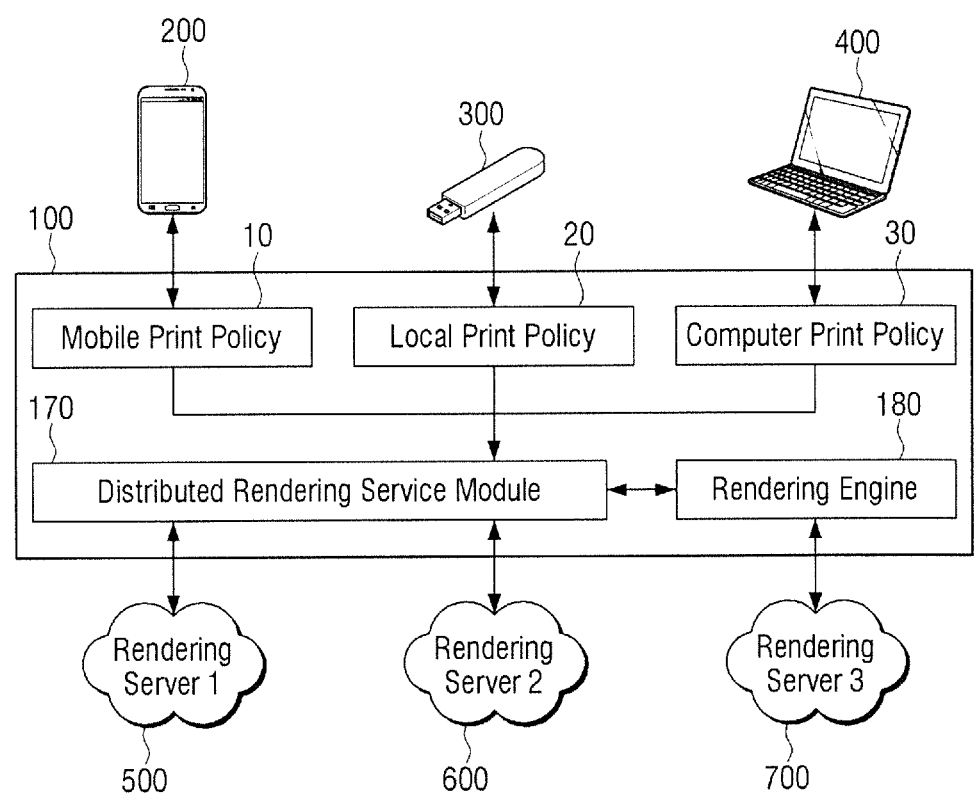
FIG. 4 is a diagram which illustrates an example of a distributed rendering service according to an example of the disclosure.

FIG. 4 is a diagram which illustrates an example of a distributed rendering service according to an example of the disclosure.

Referring to FIG. 4, first, an image forming apparatus 100 may select information on one of a plurality of policies 10, 20, 30, according to the apparatus that transmitted printing data.

To be specific, in case the image forming apparatus 100 received printing data from a mobile apparatus 200, the image forming apparatus 100 may select the mobile print policy 10 among information on a plurality of policies 10, 20, 30.

Also, in case the image forming apparatus 100 received printing data from a storage medium 300, the image forming apparatus 100 may select the local print policy 20 among information on a plurality of policies 10, 20, 30.

In addition, in case the image forming apparatus 100 received printing data from a laptop computer 400, the image forming apparatus 100 may select the computer print policy 30 among information on a plurality of policies 10, 20, 30.

Then, the image forming apparatus 100 may determine a subject performing rendering by using a distributed rendering service module (DRS module) 170, and transmit the printing data to the determined subject performing rendering.

Here, a distributed rendering service module (DRS module) 170 refers to a module that performs the function of determining a subject performing rendering based on rendering policy information and the received printing data.

To be specific, the DRS module 170 compares information on the selected policy and information on the file type of the received printing data, and thereby identify the URI address of a subject performing rendering corresponding to the file type of the received printing data.

Then, the DRS module 170 may request rendering while transmitting printing data to the identified URI address. Further, the DRS module 170 may receive rendering data corresponding to the transmitted printing data from the identified URI address.

Here, the subject performing rendering corresponding to the URI address may be a rendering service server 500, 600 existing outside the image forming apparatus 100, or it may be a rendering engine 180 existing inside the image forming apparatus 100.

Meanwhile, the rendering engine 180 does not directly perform rendering, but it may request rendering along with transmitting printing data to an external server 700 that is capable of performing rendering, instead of the DRS module 170.

To be specific, the rendering engine 180 may have the address information of the external server 700 that is capable of performing rendering. Also, when the rendering engine 180 receives printing data and a request for rendering from the DRS module 170, the rendering engine 180 may transmit the printing data and the request for rendering to the pre-stored address of the external server 700.

Then, the rendering engine 180 may acquire rendering data corresponding to the printing data from the external server 700, and transmit the rendering data to the DRS module 170. Meanwhile, the rendering engine 180 may also be referred to as a rendering program, a rendering application, etc., but it is not limited thereto.

Further, the rendering engine 180 may perform additional functions as well as a function of transmitting printing data to the external server 700 and receiving rendering data from the external server 700. For example, the rendering engine 180 may perform a security function for printing data and rendering data that are transmitted and received through communication with the external server 700. Meanwhile, additional functions performed by the rendering engine 180 are not limited to the aforementioned example.

Also, the rendering engine 180 may be an engine provided by the manufacturer of the image forming apparatus 100, or an engine provided by a third party. Accordingly, different functions may be added to the rendering engine 180 according to the provider.

In addition, the rendering engine 180 may be installed on the image forming apparatus 100 according to the control of a user. To be specific, the rendering engine 180 may be downloaded from a print application market, etc., and installed on the image forming apparatus 100, and methods of installation are not limited to the aforementioned example. Also, a plurality of rendering engines 180 may be installed, and they can obviously be removed according to the control of a user.

When a new rendering engine 180 is installed on the image forming apparatus 100, the image forming apparatus 100 may identify the rendering function provided by the rendering engine 180, and update the address information of subjects that are capable of performing rendering for each of a plurality of file types stored in the memory 130.

For example, in case a new rendering engine 180 added to the image forming apparatus 100 provides a rendering function for a file extension '*.hwp,' the image forming apparatus 100 may add the URI address information of the rendering engine 180 with respect to the file extension '*.hwp.'

Meanwhile, the rendering engine 180 may also provide a rendering function for multiple file types. In this case, the image forming apparatus 100 may add the URI address information of the rendering engine 180 with respect to each of the multiple file types.

As described above, an image forming apparatus according to an example of the disclosure may perform rendering by using a rendering engine provided by a third party as well as a rendering engine included in the image forming apparatus, other than a method of requesting rendering directly to an external server. As a rendering engine may be added or removed according to the control of a user, it provides the possibility that a user can change a subject performing rendering flexibly. Also, as additional functions can be provided according to the rendering engine, a rendering function of better quality than that of a rendering function provided as a default at the image forming apparatus may be provided.

Figure 5:
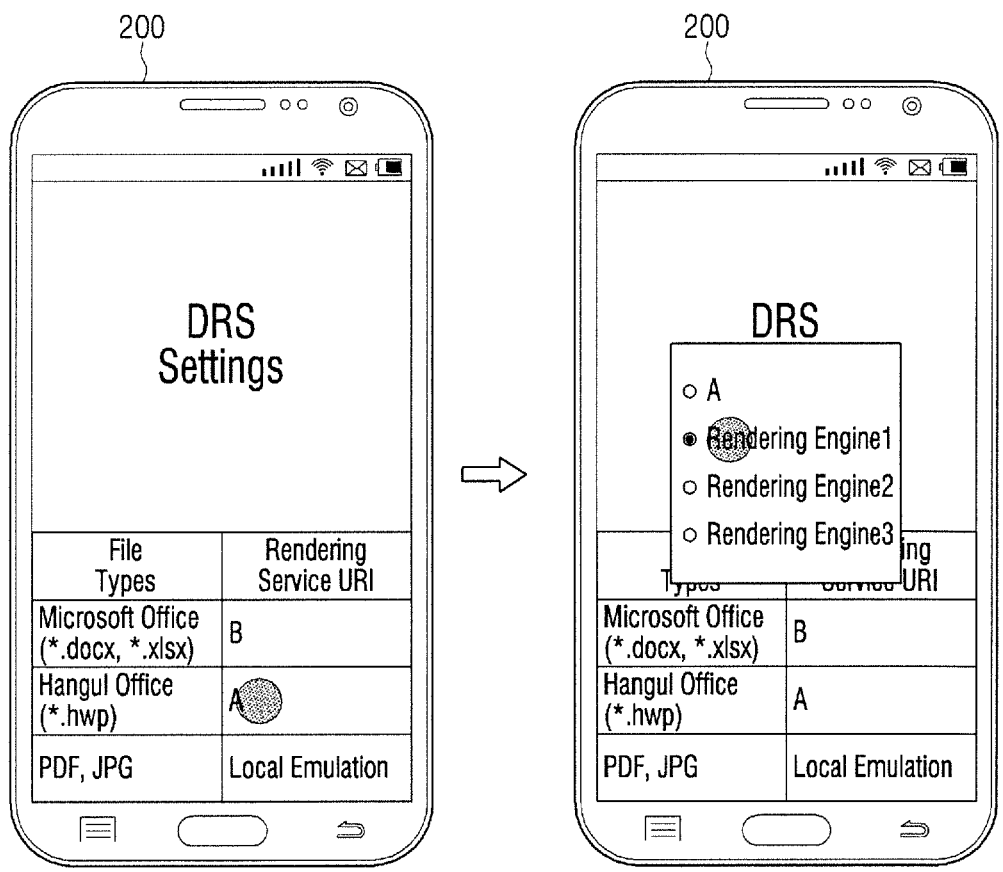
FIG. 5 is a diagram which illustrates an example of a method for setting rendering policy information according to an example of the disclosure.

FIG. 5 is a diagram which illustrates an example of a method for setting rendering policy information according to an example of the disclosure.

A mobile apparatus 200 may receive information on a mobile print policy and address information of subjects that are capable of performing rendering for each of a plurality of file types through communication with the image forming apparatus 100.

Also, the mobile apparatus 200 may display each item of the mobile print policy through the display. To be specific, the mobile apparatus 200 may display the names of subjects performing rendering that are set for each of a plurality of file types of the mobile print policy or address information of the set subjects performing rendering through the display.

For example, referring to FIG. 3, it can be figured out that 'B' is set as a subject performing rendering for the file extensions '*.docx' and '*.xlsx,' and 'A' is set as a subject performing rendering for the file extension '*.hwp,' and 'Local Emulation' is set as a subject performing rendering for the file extension '*.pdf.'

Then, the mobile apparatus 200 may change the subjects performing rendering that are set for each file type of the rending policy according to the input of a user.

To be specific, referring to FIG. 3, in case a user wishes to change the subject performing rendering for the file extension '*.hwp,' the user may click 'A' which is currently set as a subject performing rendering for '*.hwp.' Also, the mobile apparatus 200 may display 'A,' 'Rendering Engine 1,' 'Rendering Engine 2,' and 'Rendering Engine 3' as a list of subjects that are capable of performing rendering for the file extension '*.hwp.'

Here, the 'A,' 'Rendering Engine 1,' 'Rendering Engine 2,' and 'Rendering Engine 3' displayed in the list may correspond to a rendering function provided as a default at the time the image forming apparatus 100 was manufactured, or a rendering engine that the user additionally installed, etc.

Then, when selection of a specific subject performing rendering is received from the user (Rendering Engine 2 when FIG. 3 is referred to), the mobile apparatus 200 may generate information on the file type, and mapping information for the selected subject performing rendering, and transmit the information to the image forming apparatus 100.

Also, the image forming apparatus 100 may update the mobile print policy based on the mapping information received from the mobile apparatus 200. For example, according to FIG. 3, the image forming apparatus may update the mobile print policy by setting the subject performing rendering with respect to the file extension '*.hwp' of the mobile print policy as 'Rendering Engine 2.'

Meanwhile, methods of updating a rendering policy are not limited to the aforementioned method.

Also, in illustrating and describing FIG. 5, it was illustrated and described that setting of a mobile print policy was changed through a mobile apparatus. However, actual implementation may be made in such a way that setting of a computer print policy is changed through a PC, or setting of a computer print policy or a local print policy is changed through a mobile apparatus.

Figure 6:
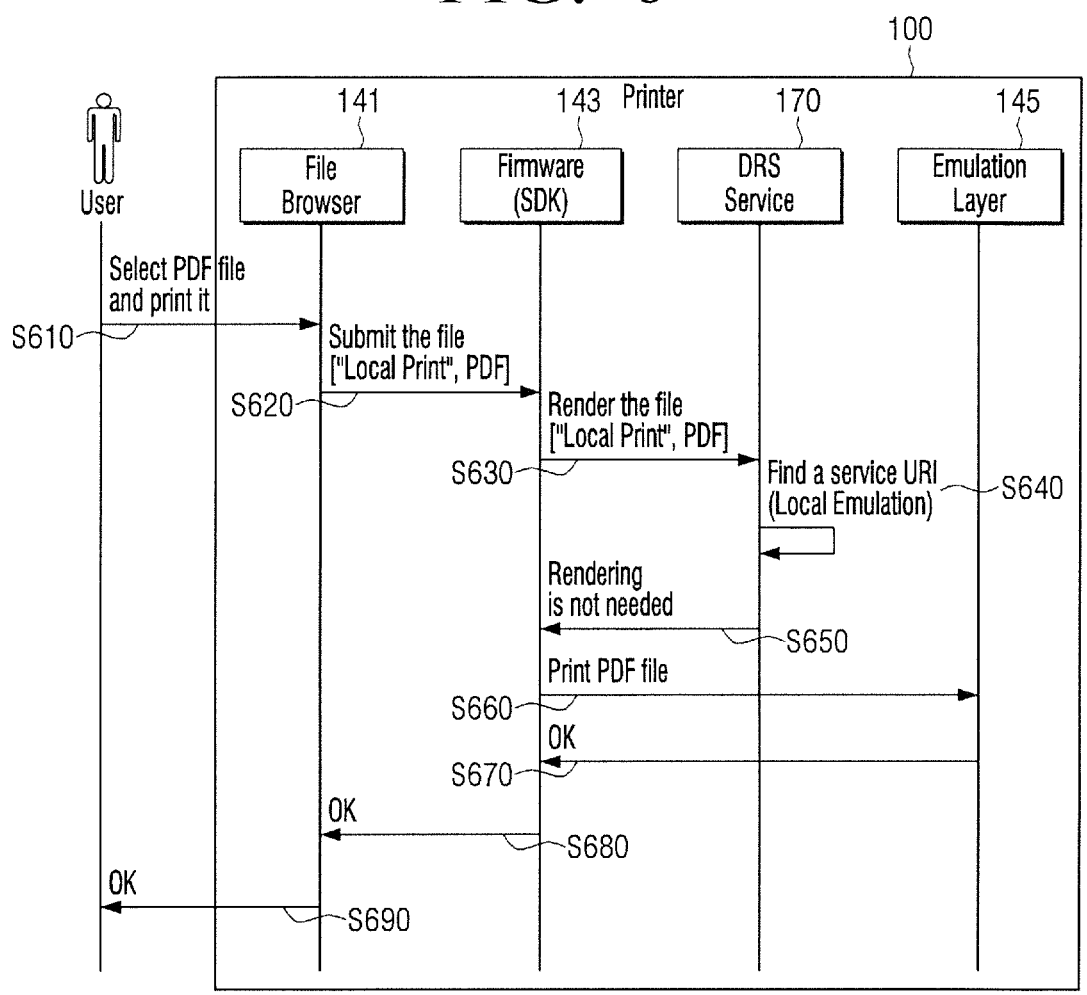
FIG. 6 is a sequence diagram for illustrating a method for performing rendering according to the first example of the disclosure.

FIG. 6 is a sequence diagram for illustrating a method for performing rendering according to the first example of the disclosure.

Referring to FIG. 6, an image forming apparatus 100 may include a file browser 141, firmware 143, a distributed rendering service module 170 and an emulation layer 145. Also, the image forming apparatus 100 may perform rendering and a printing work for printing data by using the file browser 141, firmware 143, distributed rendering service module 170 and emulation layer 145. Hereinafter, a detailed operation in this regard will be described.

First, the image forming apparatus 100 may receive a printing instruction from a user in operation S610. For example, the image forming apparatus 100 may receive selection of printing data of which file extension is '*.pdf,' among the data stored in the storage medium 300 connected to the image forming apparatus 100 from a user, and receive a printing instruction for the selected printing data.

Then, the file browser 141 of the image forming apparatus 100 may transmit the selected printing data and information on the transmitting apparatus of the selected printing data to the firmware 143 in operation S620. For example, the file browser 141 may transmit printing data of which file extension is '*.pdf' and apparatus information of the storage medium 300 to the firmware 143.

Further, the firmware 143 may request the distributed rendering service module 170 to perform a rendering function in operation S630. For example, the firmware 143 may request the distributed rendering service module 170 to perform a rendering function, along with transmitting printing data of which file extension is '*.pdf' and apparatus information of the storage medium 300.

Then, the distributed rendering service module 170 may determine a subject performing rendering, and identify the URI address information of the subject performing rendering in operation S640. For example, the distributed rendering service module 170 may identify a local print policy as a rendering policy corresponding to the apparatus information of the storage medium 300 among a plurality of rendering policies. Then, the distributed rendering service module 170 may identify that the subject performing rendering with respect to the file extension '*.pdf' is 'Local Emulation,' based on information on the local print policy. 'Local Emulation' is the image forming apparatus 100 itself, and the address information of the 'Local Emulation' may be 'http://localhost.'

Also, the distributed rendering service module 170 may determine that rendering through an external apparatus to render is unnecessary, and transmit the determination result to the firmware 143 in operation S650. For example, in case the distributed rendering service module 170 determined that the subject performing rendering is the image forming apparatus 100, the distributed rendering service module 170 may determine that rendering through an external apparatus to render is unnecessary, and transmit the determination result to the firmware 143.

Then, the firmware 143 may transmit printing data to the emulation layer 145 in operation S660. For example, the firmware 143 may transmit printing data of which file extension is '*.pdf' to the emulation layer 145.

Meanwhile, the emulation layer 145 may perform rendering of the printing data. For example, the emulation layer 145 may perform parsing and rendering of the printing data by using PDF emulation which enables printing processing of a PDF file. Then, the image forming apparatus 100 may perform printing by using the rendering data.

After printing is completed, a signal notifying that printing has been completed may be transmitted to the user through the firmware 143, the file browser 141, etc. in operations S670, S680 and S690. For example, a message informing that printing has been completed may be displayed to the user through the display of the image forming apparatus 100.

Figure 7:
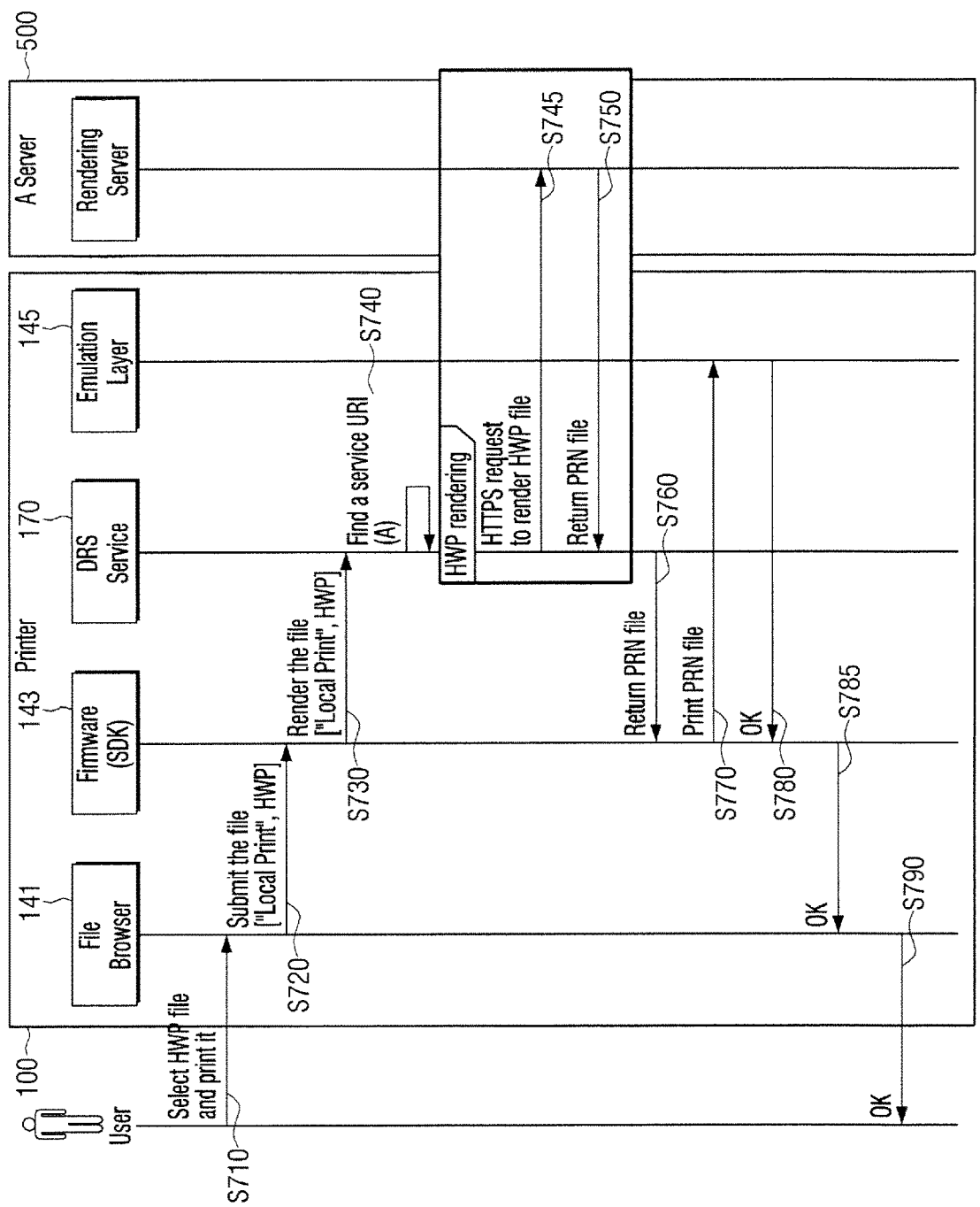
FIG. 7 is a sequence diagram for illustrating a method for performing rendering according to the second example of the disclosure.

FIG. 7 is a sequence diagram for illustrating a method for performing rendering according to the second example of the disclosure.

Referring to FIG. 7, first, the image forming apparatus 100 may receive a printing instruction from a user in operation S710. For example, the image forming apparatus 100 may receive selection of printing data of which file extension is '*.hwp' among the data stored in the storage medium 300 connected to the image forming apparatus 100 from a user, and receive a printing instruction for the selected printing data.

Then, the file browser 141 of the image forming apparatus 100 may transmit the selected printing data and information on the transmitting apparatus of the selected printing data to the firmware 143 in operation S720. For example, the file browser 141 may transmit printing data of which file extension is '*.hwp' and apparatus information of the storage medium 300 to the firmware 143.

Further, the firmware 143 may request the distributed rendering service module 170 to perform a rendering function in operation S730. For example, the firmware 143 may request the distributed rendering service module 170 to perform a rendering function, along with transmitting printing data of which file extension is '*.hwp' and apparatus information of the storage medium 300.

Then, the distributed rendering service module 170 may determine a subject performing rendering, and identify the URI address information of the subject performing rendering in operation S740. For example, the distributed rendering service module 170 may identify a local print policy as a rendering policy corresponding to the apparatus information of the storage medium 300 among a plurality of rendering policies. Then, the distributed rendering service module 170 may identify that the subject performing rendering with respect to the file extension '*.hwp' is 'A,' based on information on the local print policy, and the URI address of 'A.'

Further, the distributed rendering service module 170 may transmit the printing data to the URI address of the subject performing rendering in step S745. For example, the distributed rendering service module 170 may transmit printing data of which file extension is '*.hwp' to the URI address of an external server 500 corresponding to 'A.'

Then, the distributed rendering service module 170 may receive rendering data from the URI address of the subject performing rendering in step S750. For example, the distributed rendering service module 170 may receive rendering data corresponding to the printing data from the URI address of the external server 500.

Also, the distributed rendering service module 170 may transmit the rendering data to the firmware 143 in step S760, and the firmware 143 may transmit the rendering data to the emulation layer 145 in step S770.

Meanwhile, the image forming apparatus 100 may perform printing by using rendering data.

Then, when printing is completed, a signal notifying that printing has been completed may be transmitted to a user through the firmware 143, the file browser 141, etc. in steps S780, S785 and S790. For example, a message informing that printing has been completed may be displayed to the user through the display of the image forming apparatus 100.

Figure 8:
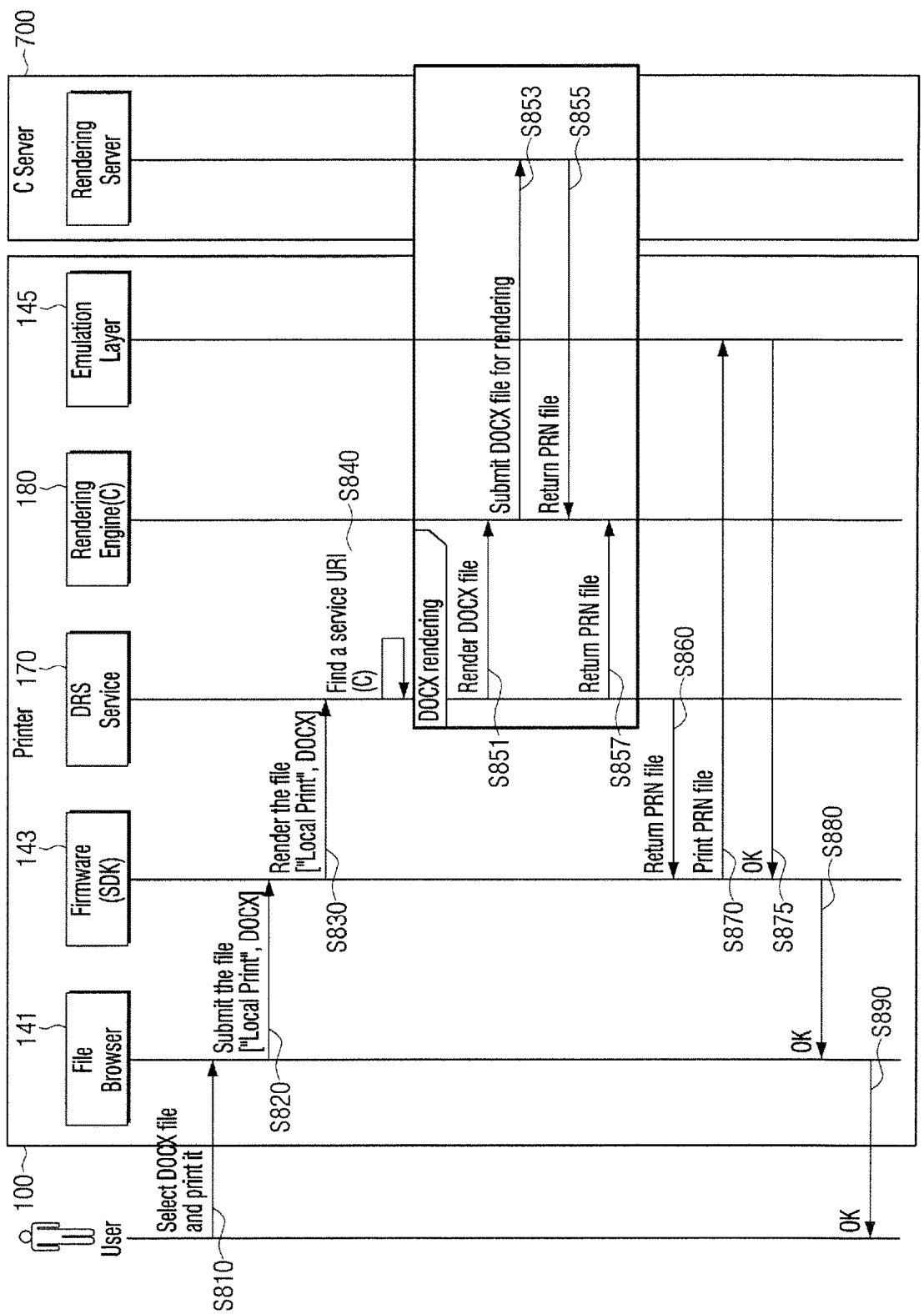
FIG. 8 is a sequence diagram for illustrating a method for performing rendering according to the third example of the disclosure.

FIG. 8 is a sequence diagram for illustrating a method for performing rendering according to the third example of the disclosure.

Referring to FIG. 8, first, the image forming apparatus 100 may receive a printing instruction from a user in operation S810. For example, the image forming apparatus 100 may receive selection of printing data of which file extension is '*.docx' among the data stored in the storage medium 300 connected to the image forming apparatus 100 from a user, and receive a printing instruction for the selected printing data.

Then, the file browser 141 of the image forming apparatus 100 may transmit the selected printing data and information on the transmitting apparatus of the selected printing data to the firmware 143 in operation S820. For example, the file browser 141 may transmit printing data of which file extension is '*.docx' and apparatus information of the storage medium 300 to the firmware 143.

Further, the firmware 143 may request the distributed rendering service module 170 to perform a rendering function in operation S830. For example, the firmware 143 may request the distributed rendering service module 170 to perform a rendering function, along with transmitting printing data of which file extension is '*.docx' and apparatus information of the storage medium 300.

Then, the distributed rendering service module 170 may determine a subject performing rendering, and identify the URI address information of the subject performing rendering in operation S840. For example, the distributed rendering service module 170 may identify a local print policy as a rendering policy corresponding to the apparatus information of the storage medium 300 among a plurality of rendering policies. Then, the distributed rendering service module 170 may identify that the subject performing rendering with respect to the file extension '*.docx' is 'C,' based on information on the local print policy, and the URI address of 'C.'

Further, the distributed rendering service module 170 may transmit the printing data to the URI address of the subject performing rendering in operation S851. For example, the distributed rendering service module 170 may transmit printing data of which file extension is '*.docx' to the URI address of a rendering engine 180 corresponding to 'C.'

Meanwhile, the rendering engine 180 may transmit printing data to an external server 700 that is capable of performing rendering of printing data, and receive rendering data from the external server 700 in operations S853 and S855. For example, the rendering engine 180 corresponding to 'C' may transmit printing data and a request for rendering to the address of the external server 700, and receive rendering data corresponding to the printing data from the address of the external server 700. Then, the rendering engine 180 may transmit the received rendering data to the distributed rendering service module 170 in operation S857.

Further, the distributed rendering service module 170 may transmit the rendering data to the firmware 143 in operation S860, and the firmware 143 may transmit the rendering data to an emulation layer 145 in operation S870.

Meanwhile, the image forming apparatus 100 may perform printing by using the rendering data.

After printing is completed, a signal notifying that printing has been completed may be transmitted to the user through the firmware 143, the file browser 141, etc. in operations S875, S880 and S890. For example, a message informing that printing has been completed may be displayed to the user through the display of the image forming apparatus 100.

Meanwhile, in illustrating and describing FIGS. 6 to 8, it was illustrated and described that printing data is received from a storage medium, and rendering is performed according to a rendering policy corresponding to the storage medium. However, in actual implementation, printing data can be received from external apparatuses such as a mobile apparatus, a laptop computer, a PC, etc. other than a storage medium, and rendering can obviously be performed according to a rendering policy corresponding to each external apparatus.

Figure 9:
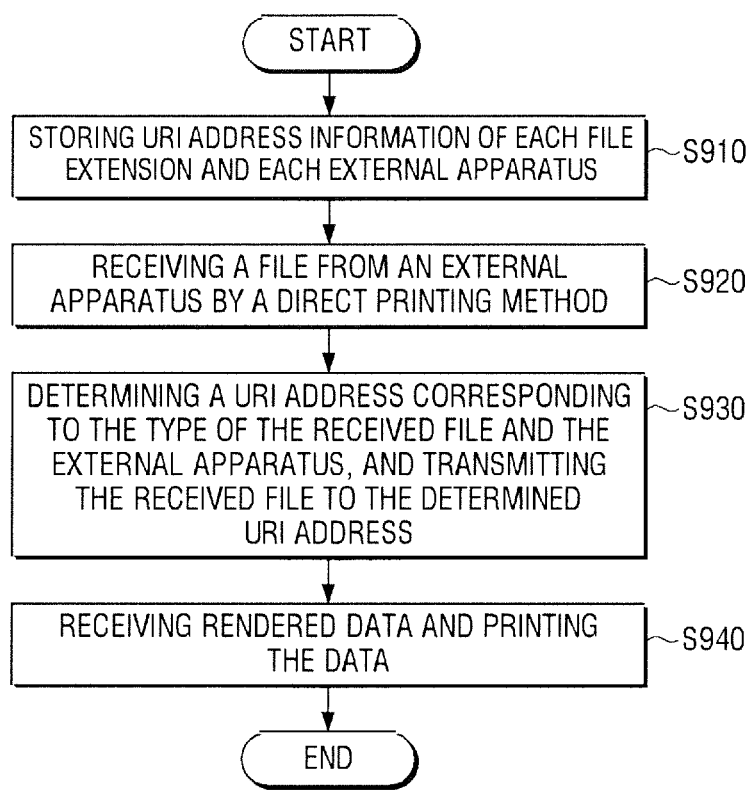
FIG. 9 is a flow chart for illustrating an image forming method according to an example of the disclosure.

FIG. 9 is a flow chart for illustrating an image forming method according to an example of the disclosure.

Referring to FIG. 9, first, URI addresses information of each of a plurality of file types and each of a plurality of external apparatuses, is stored in operation S910. For each of a plurality of file types, address information on a subject that is capable of performing rendering of printing data having the file type may be stored. Also, in case there are a plurality of subjects that are capable of performing rendering of printing data having a specific type, address information of each of the plurality of subjects performing rendering with respect to the type may be stored.

Also, for each of a plurality of file types, address information on a subject performing rendering that is set to perform rendering may additionally be stored. This information may be referred to as rendering policy information, but the name is not limited thereto. The image forming apparatus may determine a subject performing rendering of printing data with reference to rendering policy information.

Meanwhile, rendering policy information may be stored differently for each apparatus that transmitted printing data. For example, as a mobile apparatus, a storage medium like a USB, a PC, a laptop computer, etc. may transmit printing data to an image forming apparatus, rendering policy information may be stored for each of a plurality of apparatuses such as a mobile apparatus, a storage medium like a USB, a PC, a laptop computer, etc.

Accordingly, setting may be made such that different URI addresses are used for at least one file type for each of a plurality of external apparatuses.

Meanwhile, a file is received by a direct printing method from an external apparatus in operation S920. To be specific, a file such as PDF, XPS, BMP, JPG, etc. itself, but not data of a printer language such as a postscript (PS) and a printer control language (PCL) may be received from an external apparatus.

Then, the type of the received file is identified, and a URI address corresponding to the external apparatus and the file type is determined by using pre-stored URI address information of each of a plurality of file types and a plurality of external apparatuses, and the received file is transmitted to the determined URI address in operation S930.

To be specific, a rendering policy corresponding to the external apparatus that transmitted the file may be identified, among a plurality of rendering policies, and a subject performing rendering corresponding to the type of the file may be identified by using the identified rendering policy, and the URI address of the identified subject performing rendering may thereby be determined. Then, the received file may be transmitted to the determined URI address.

Further, when rendering data corresponding to the file is received from the determined address, the rendering data is printed in operation S940. To be specific, when rendering of the file by the determined subject performing rendering is completed, rendering data corresponding to the transmitted file may be received from the URI address of the subject performing rendering. Then, the rendering data may be printed by using a printing engine.

Meanwhile, in case the determined subject performing rendering is an image forming apparatus, the image forming apparatus may perform rendering of the received file. To be specific, the image forming apparatus may parse the file, and perform rendering of the file by using a rendering module performing rendering corresponding to the type of the received file.

Meanwhile, rendering data corresponding to the file may not be received from the determined URI address. In this case, the received file may be transmitted to another subject that is capable of performing rendering. To be specific, the type of the received file may be identified, and it may be identified whether there is another subject that is capable of performing rendering by using the pre-stored address information of subjects that are capable of performing rendering for each of a plurality of file types. Then, if another subject is identified, the received file may be transmitted again to the address of the identified another subject. In case a plurality of other subjects that are capable of performing rendering are identified, the received file may be transmitted to a subject performing rendering that is set as a default.

Meanwhile, address information on subjects that are capable of performing rendering for each file type may be added. To be specific, information on a new subject that is capable of performing rendering of an existing file type may be acquired from an external apparatus. Also, information on a subject that is capable of performing rendering of a new file type may be acquired from an external apparatus, In addition, the received information may be added to the pre-stored address information of subjects that are capable of performing rendering of each of a plurality of file types.

Meanwhile, information on a plurality of rendering policies may be updated by various methods.

To be specific, URI addresses for each of a plurality of types of each of a plurality of external apparatuses may be set. To be more specific, with respect to each of a plurality of rendering policies, input of setting such as addition, deletion, change, etc. of address information of rendering services for each of a plurality of types may be received from a user, through an input device of an image forming apparatus.

Then, the stored URI address information may be updated based on the setting. To be specific, according to the setting inputted through an input device, URI address information of subjects performing rendering that are set for each of a plurality of file types of each of a plurality of rendering policies may be updated.

As another method, with respect to a rendering policy corresponding to an external apparatus, mapping information between the file type and the URI address information may be received from the external apparatus. Then, information on a rendering policy corresponding to the external apparatus may be updated based on the received mapping information.

Meanwhile, mapping information received from an external apparatus is not limited to mapping information with respect to information on a rendering policy corresponding to the external apparatus, and mapping information with respect to information on a rendering policy corresponding to another external apparatus other than the external apparatus may be received. In this case, information on a rendering policy corresponding to another external apparatus may be updated by using the received mapping information.

As described above, in a method for controlling an image forming apparatus according to an example of the disclosure, address information of subjects that are capable of performing rendering of each of a plurality of file types may be added. Accordingly, a more extended rendering function can be provided, compared to a conventional method of performing rendering by using a subject performing rendering set as a default. Also, rendering of a document in a new format can be performed even if the firmware of an image forming apparatus is not updated, or a new image forming apparatus is not purchased.

Also, in a method for controlling an image forming apparatus according to an example of the disclosure, setting of rendering functions may vary for each apparatus requesting a printing work to an image forming apparatus. Accordingly, the scope of setting of a rendering function based on user preference becomes wider, and user convenience can thereby be increased.

A control method as illustrated in FIG. 9 may be executed in an image forming apparatus having a configuration as illustrated in FIG. 1 or 2, and the method may also be executed in image forming apparatuses having other configurations.

Also, the aforementioned method for controlling an image forming apparatus may be implemented as at least one execution program for executing the aforementioned method for controlling an image forming apparatus, and such an execution program may be stored in a non-transitory readable medium.

A non-transitory readable medium refers to a medium that stores data semi-permanently, and is readable by machines, but not a medium that stores data for a short moment such as a register, a cache, and memory. To be specific, the aforementioned various applications or programs may be provided while being stored in a non-transitory readable medium such as a CD, a DVD, a hard disc, a blue-ray disc, a USB, a memory card, a ROM, and the like.

While the disclosure has been shown and described with reference to examples thereof, the disclosure is not limited to the aforementioned specific examples, and it is apparent that various modifications can be made by those having ordinary skill in the technical field to which the disclosure belongs, without departing from the gist of the disclosure as claimed by the appended claims, and such modifications are within the scope of the descriptions of the claims.

What is claimed is:

1. An image forming apparatus comprising:
   a printing engine;
   a memory to store information indicating correspondences of a plurality of file types of files and uniform resource identifier (URI) addresses of rendering subjects to render printing data of each file type of the plurality of file types in correspondence to each of a plurality of external apparatuses;
   a communication device to receive a file by a direct printing function method from an external apparatus among the external apparatuses; and
   a processor to,
     identify a file type of the received file,
     determine a URI address corresponding to the identified file type and to the external apparatus, according to the information indicating correspondences,
     control the communication device to transmit the received file to the determined URI address,
     receive, from the determined URI address, rendered data, printable by the printing engine, corresponding to the received file.

2. The image forming apparatus of claim 1, further comprising:
   an operation input device to receive input of setting the URI addresses corresponding to each file type of a plurality of file types in correspondence to each of the plurality of external apparatuses,
   wherein the processor is to update the information indicating correspondences based on the input setting.

3. The image forming apparatus of claim 1,
   wherein the information indicating correspondences includes a plurality of URI addresses available for at least one file type, and includes different URI addresses for the at least one file type in correspondence to each of the plurality of external apparatuses.

4. The image forming apparatus of claim 1,
   wherein the processor is to control, based on not receiving the rendered data corresponding to the file from the determined URI address, the communication device to transmit the received file to another URI address capable of rendering the identified file type, according to the information indicating correspondences.

5. The image forming apparatus of claim 1,
   wherein the communication device receives mapping information between URI addresses and file types, from an external apparatus among the external apparatuses, and
   the processor is to update the information indicating correspondences based on the received mapping information.

6. The image forming apparatus of claim 1,
   wherein the information indicating correspondences stores URI addresses of each file type of a plurality of file types in correspondence to at least one external apparatus among the external apparatuses.

7. The image forming apparatus of claim 1,
   wherein the processor is to add, based on receiving a new file type, a URI address of a rendering subject to render the new file type, and the received new file type, in the information indicating correspondences.

8. An image forming method of an image forming apparatus, the method comprising:
   storing information indicating correspondences of a plurality of file types of files and uniform resource identifier (URI) addresses of rendering subjects to render printing data of each file type of the plurality of file types in correspondence to each of a plurality of external apparatuses;
   receiving a file by a direct printing function method from an external apparatus among the external apparatuses;
   identifying a file type of the received file;
   determining a URI address corresponding to the identified file type and to the external apparatus, according to the information indicating correspondences;
   transmitting the received file to the determined URI address; and
   receiving, from the determined URI address, rendered data, printable by a printing engine, corresponding to the received file.

9. The image forming method of claim 8, further comprising:
   receiving setting of the URI addresses corresponding to each file type of a plurality of file types in correspondence to each of the plurality of external apparatuses; and
   updating the stored information indicating correspondences based on the setting.

10. The image forming method of claim 8,
    wherein the information indicating correspondences includes a plurality of URI addresses available for at least one file type, and includes different URI addresses for the at least one file type in correspondence to each of the plurality of external apparatuses.

11. The image forming method of claim 8, further comprising:
    based on not receiving the rendered data corresponding to the file from the determined URI address, transmitting the received file to another URI address that is capable of rendering the identified file type, according to the information indicating correspondences.

12. The image forming method of claim 8, further comprising:
   receiving mapping information between URI addresses and file types, from an external apparatus among the external apparatuses; and
   updating the information indicating correspondences based on the received mapping information.

13. The image forming method of claim 8,
   wherein the information indicating correspondences stores URI addresses of each file type of a plurality of file types in correspondence to at least one external apparatus among the external apparatuses.

14. The image forming method of claim 8, further comprising:
   receiving a new file type and a URI address of a rendering subject to render the new file type; and
   adding the received new file type and URI address to the information indicating correspondences.

15. A non-transitory computer readable recording medium storing a program to execute an image forming method of an image forming apparatus, wherein the image forming method comprises:
   storing information indicating correspondences of each of a plurality of file types of files and uniform resource identifier (URI) addresses of rendering subjects to render printing data of each file type of the plurality of file types in correspondence to each of a plurality of external apparatuses;
   receiving a file by a direct printing function method from an external apparatus among the external apparatuses;
   identifying a file type of the received file;
   determining a URI address corresponding to the identified file type and to the external apparatus, according to the information indicating correspondences;
   transmitting the received file to the determined URI address; and
   receiving, from the determined URI address, rendered data, printable by a printing engine, corresponding to the file.

* * * * *